(12) United States Patent
Bowditch et al.

(10) Patent No.: US 11,310,268 B2
(45) Date of Patent: Apr. 19, 2022

(54) SYSTEMS AND METHODS USING COMPUTER VISION AND MACHINE LEARNING FOR DETECTION OF MALICIOUS ACTIONS

(71) Applicant: Secureworks Corp., Wilmington, DE (US)

(72) Inventors: William Parke Bowditch, Edinburgh (GB); Raul Garcia Calvo, Edinburgh (GB)

(73) Assignee: Secureworks Corp., Wilmington, DE (US)

( * ) Notice: Subject to any disclaimer, the term of this patent is extended or adjusted under 35 U.S.C. 154(b) by 114 days.

(21) Appl. No.: 16/404,140

(22) Filed: May 6, 2019

(65) Prior Publication Data
US 2020/0358819 A1  Nov. 12, 2020

(51) Int. Cl.
*H04L 9/40* (2022.01)
*G06F 17/18* (2006.01)
*G06N 20/00* (2019.01)
*G06K 9/62* (2022.01)
*H04L 29/06* (2006.01)

(52) U.S. Cl.
CPC .......... *H04L 63/1483* (2013.01); *G06F 17/18* (2013.01); *G06K 9/6267* (2013.01); *G06N 20/00* (2019.01)

(58) Field of Classification Search
CPC .... H04L 63/1483; G06N 20/00; G06N 20/10; G06N 20/20; G06N 3/08; G06F 17/18; G06K 9/6267
See application file for complete search history.

(56) References Cited

U.S. PATENT DOCUMENTS

| | | |
|---|---|---|
| 5,937,066 A | 8/1999 | Gennaro |
| 6,357,010 B1 | 3/2002 | Viets et al. |
| 7,269,578 B2 | 9/2007 | Sweeney |
| 7,331,061 B1 | 2/2008 | Ramsey et al. |

(Continued)

FOREIGN PATENT DOCUMENTS

| | | | | |
|---|---|---|---|---|
| EP | 3599753 A1 | * | 1/2020 | ......... H04L 63/1416 |
| RU | 2738344 C1 | | 12/2020 | |

(Continued)

OTHER PUBLICATIONS

S. Afroz and R. Greenstadt, "PhishZoo: Detecting Phishing Websites by Looking at Them," 2011 IEEE Fifth International Conference on Semantic Computing, 2011, pp. 368-375, doi: 10.1109/ICSC.2011.52. (Year: 2011).*

(Continued)

*Primary Examiner* — Michael Simitoski
(74) *Attorney, Agent, or Firm* — Womble Bond Dickinson (US) LLP (57) ABSTRACT

The present disclosure provides systems and methods for classifying or determined whether a request for a user's information is malicious or safe/legitimate. Request information related to a request for a user's information can be received, and one or more screenshots associated with the request can be obtained and provided to a machine learning model. The machine learning model can generate a probability or confidence level that the request is malicious.

22 Claims, 6 Drawing Sheets

(56) References Cited

U.S. PATENT DOCUMENTS

| | | | | |
|---|---|---|---|---|
| 7,492,957 | B1* | 2/2009 | Bonhaus | G06K 9/6206 348/384.1 |
| 7,548,932 | B2 | 6/2009 | Horvitz et al. | |
| 7,555,482 | B2 | 6/2009 | Korkus | |
| 7,571,474 | B2 | 8/2009 | Ross et al. | |
| 7,594,270 | B2 | 9/2009 | Church et al. | |
| 7,606,801 | B2 | 10/2009 | Faitelson et al. | |
| 7,613,722 | B2 | 11/2009 | Horvitz et al. | |
| 7,770,031 | B2 | 8/2010 | MacKay et al. | |
| 7,856,411 | B2 | 12/2010 | Darr | |
| 8,079,081 | B1 | 12/2011 | Lavrik et al. | |
| 8,122,495 | B2 | 2/2012 | Ramsey et al. | |
| 8,156,553 | B1 | 4/2012 | Church et al. | |
| 8,327,419 | B1 | 12/2012 | Korablev | |
| 8,407,335 | B1 | 3/2013 | Church et al. | |
| 8,490,193 | B2 | 7/2013 | Sarraute et al. | |
| 8,490,196 | B2 | 7/2013 | Lucangeli et al. | |
| 8,522,350 | B2 | 8/2013 | Davenport et al. | |
| 8,539,575 | B2 | 9/2013 | Sehmitlin et al. | |
| 8,578,393 | B1 | 11/2013 | Fisher | |
| 8,595,170 | B2 | 11/2013 | Gladstone et al. | |
| 8,621,618 | B1 | 12/2013 | Ramsey et al. | |
| 8,701,176 | B2 | 4/2014 | Ramsey et al. | |
| 8,805,881 | B2 | 8/2014 | Hom et al. | |
| 8,832,048 | B2 | 9/2014 | Lim | |
| 8,839,414 | B2 | 9/2014 | Mantle et al. | |
| 8,898,777 | B1* | 11/2014 | Oliver | H04L 63/1416 726/22 |
| 8,909,673 | B2 | 12/2014 | Faitelson et al. | |
| 8,931,095 | B2 | 1/2015 | Ramsey et al. | |
| 8,938,802 | B2 | 1/2015 | Davenport et al. | |
| 8,959,115 | B2 | 2/2015 | Marathe | |
| 8,984,644 | B2 | 3/2015 | Oliphant et al. | |
| 9,009,828 | B1 | 4/2015 | Ramsey et al. | |
| 9,032,478 | B2 | 5/2015 | Ballesteros et al. | |
| 8,938,476 | B2 | 6/2015 | Jerhotova et al. | |
| 9,046,886 | B2 | 6/2015 | Chong et al. | |
| 9,047,336 | B2 | 6/2015 | Hom et al. | |
| 9,069,599 | B2 | 6/2015 | Martinez et al. | |
| 9,098,702 | B2 | 8/2015 | Rubin et al. | |
| 9,129,105 | B2 | 9/2015 | Donley et al. | |
| 9,130,988 | B2* | 9/2015 | Seifert | H04L 63/168 |
| 9,137,262 | B2 | 9/2015 | Qureshi | |
| 9,298,895 | B2 | 3/2016 | Lim | |
| 9,319,426 | B2 | 4/2016 | Webb et al. | |
| 9,338,134 | B2 | 5/2016 | Yin | |
| 9,338,180 | B2 | 5/2016 | Ramsey et al. | |
| 9,430,534 | B2 | 8/2016 | Bhattacharya et al. | |
| 9,438,563 | B2 | 9/2016 | Yin | |
| 9,519,756 | B2 | 12/2016 | Bitran et al. | |
| 9,544,273 | B2 | 1/2017 | Fleury | |
| 9,548,994 | B2 | 1/2017 | Pearcy | |
| 9,558,352 | B1* | 1/2017 | Dennison | G06F 16/9535 |
| 9,560,062 | B2 | 1/2017 | Khatri et al. | |
| 9,560,068 | B2 | 1/2017 | Figlin et al. | |
| 9,596,252 | B2 | 3/2017 | Coates et al. | |
| 9,628,511 | B2 | 4/2017 | Ramsey et al. | |
| 9,667,656 | B2 | 5/2017 | Banerjee et al. | |
| 9,667,661 | B2 | 5/2017 | Sharma et al. | |
| 9,710,672 | B2 | 7/2017 | Braun | |
| 9,742,559 | B2 | 8/2017 | Christodorescu | |
| 9,767,302 | B2 | 9/2017 | Lim | |
| 9,805,202 | B2 | 10/2017 | Medeiros et al. | |
| 9,910,986 | B1* | 3/2018 | Saxe | G06N 5/025 |
| 9,973,524 | B2 | 5/2018 | Boyer | |
| 10,050,992 | B2 | 8/2018 | Thyni | |
| 10,116,500 | B1 | 10/2018 | Long | |
| 10,311,231 | B1 | 6/2019 | Kayyoor | |
| 10,356,125 | B2* | 7/2019 | Goutal | G06F 21/6263 |
| 10,382,489 | B2 | 8/2019 | Das | |
| 10,419,903 | B2 | 9/2019 | Singh et al. | |
| 10,425,223 | B2 | 9/2019 | Roth | |
| 10,474,820 | B2 | 11/2019 | Manadhata | |
| 10,491,632 | B1 | 11/2019 | Natarajan | |
| 10,567,407 | B2* | 2/2020 | Tang | G06F 16/951 |
| 10,601,865 | B1* | 3/2020 | Mesdaq | H04L 51/12 |
| 10,728,263 | B1 | 7/2020 | Neumann | |
| 10,762,206 | B2* | 9/2020 | Titonis | G06F 21/56 |
| 10,834,128 | B1* | 11/2020 | Rajagopalan | H04L 51/18 |
| 10,853,431 | B1* | 12/2020 | Lin | G06F 16/9566 |
| 10,915,828 | B2* | 2/2021 | Qin | H04L 67/10 |
| 11,044,263 | B2 | 6/2021 | McLean et al. | |
| 2002/0129135 | A1 | 9/2002 | Delany et al. | |
| 2005/0138204 | A1 | 6/2005 | Iyer et al. | |
| 2005/0288939 | A1 | 12/2005 | Peled et al. | |
| 2006/0012815 | A1 | 1/2006 | Edner | |
| 2006/0037076 | A1 | 2/2006 | Roy | |
| 2006/0195575 | A1 | 8/2006 | Delany et al. | |
| 2006/0253447 | A1 | 11/2006 | Judge | |
| 2007/0226248 | A1 | 9/2007 | Darr | |
| 2007/0226807 | A1 | 9/2007 | Ginter et al. | |
| 2008/0077593 | A1 | 3/2008 | Abrams et al. | |
| 2008/0219334 | A1 | 9/2008 | Brainos | |
| 2008/0255997 | A1 | 10/2008 | Bluhm | |
| 2008/0262991 | A1* | 10/2008 | Kapoor | H04L 63/14 706/20 |
| 2008/0320000 | A1 | 12/2008 | Gaddam | |
| 2009/0198682 | A1 | 8/2009 | Buehler et al. | |
| 2010/0083374 | A1 | 4/2010 | Schmitlin et al. | |
| 2010/0125913 | A1 | 5/2010 | Davenport et al. | |
| 2011/0004771 | A1 | 1/2011 | Matsushima | |
| 2011/0179492 | A1 | 7/2011 | Markopoulou | |
| 2011/0276604 | A1 | 11/2011 | Hom et al. | |
| 2011/0276716 | A1* | 11/2011 | Coulson | H04L 29/12613 709/238 |
| 2012/0117640 | A1 | 5/2012 | Ramsey et al. | |
| 2012/0185275 | A1 | 7/2012 | Loghmani | |
| 2012/0246730 | A1 | 9/2012 | Raad | |
| 2012/0254333 | A1* | 10/2012 | Chandramouli | G06N 5/04 709/206 |
| 2012/0260341 | A1 | 10/2012 | Chan et al. | |
| 2013/0104191 | A1 | 4/2013 | Peled et al. | |
| 2013/0138428 | A1* | 5/2013 | Chandramouli | G06F 40/40 704/9 |
| 2013/0173620 | A1 | 7/2013 | Takenouchi | |
| 2013/0226938 | A1 | 8/2013 | Risher et al. | |
| 2013/0238319 | A1 | 9/2013 | Minegishi et al. | |
| 2013/0282746 | A1 | 10/2013 | Balko | |
| 2013/0291103 | A1 | 10/2013 | Davenport et al. | |
| 2013/0318604 | A1 | 11/2013 | Coates et al. | |
| 2014/0004102 | A1 | 2/2014 | Ramsey et al. | |
| 2014/0047544 | A1 | 2/2014 | Jakobsson | |
| 2014/0051432 | A1 | 2/2014 | Gupta | |
| 2014/0222712 | A1 | 8/2014 | Samaha | |
| 2014/0373151 | A1 | 12/2014 | Webb et al. | |
| 2015/0019323 | A1 | 1/2015 | Goldberg | |
| 2015/0040225 | A1 | 2/2015 | Coates et al. | |
| 2015/0074390 | A1* | 3/2015 | Stoback | H04L 63/1483 713/156 |
| 2015/0135287 | A1 | 5/2015 | Medeiros et al. | |
| 2015/0156212 | A1 | 6/2015 | Khatri et al. | |
| 2015/0186618 | A1 | 7/2015 | Poorvin | |
| 2015/0222652 | A1 | 8/2015 | Ramsey et al. | |
| 2015/0271047 | A1 | 9/2015 | McLean | |
| 2015/0324457 | A1 | 11/2015 | McLean | |
| 2016/0014140 | A1 | 1/2016 | Akireddy | |
| 2016/0014151 | A1 | 1/2016 | Prakash | |
| 2016/0078365 | A1 | 3/2016 | Baumard | |
| 2016/0099963 | A1 | 4/2016 | Mahaffey | |
| 2016/0139886 | A1 | 5/2016 | Perdriau | |
| 2016/0182546 | A1 | 6/2016 | Coates et al. | |
| 2016/0241591 | A1 | 8/2016 | Ramsey et al. | |
| 2016/0277423 | A1 | 9/2016 | Apostolescu et al. | |
| 2016/0313709 | A1 | 10/2016 | Biesdorf | |
| 2016/0337400 | A1 | 11/2016 | Gupta | |
| 2016/0342805 | A1 | 11/2016 | Lim | |
| 2016/0378978 | A1 | 12/2016 | Singla | |
| 2017/0026343 | A1 | 1/2017 | Wardman | |
| 2017/0063893 | A1* | 3/2017 | Franc | H04L 63/0281 |
| 2017/0098087 | A1 | 4/2017 | Li | |
| 2017/0111379 | A1 | 4/2017 | Khatri et al. | |
| 2017/0140295 | A1 | 5/2017 | Bandara | |
| 2017/0142149 | A1 | 5/2017 | Coates et al. | |
| 2017/0169154 | A1 | 6/2017 | Lin et al. | |

(56) References Cited

U.S. PATENT DOCUMENTS

| | | |
|---|---|---|
| 2017/0171228 A1 | 6/2017 | McLean |
| 2017/0180418 A1* | 6/2017 | Shen ................ H04L 63/1416 |
| 2017/0201381 A1 | 7/2017 | Kinder et al. |
| 2017/0201431 A1 | 7/2017 | Kinder et al. |
| 2017/0201490 A1 | 7/2017 | Kinder et al. |
| 2017/0201548 A1 | 7/2017 | Kinder et al. |
| 2017/0243004 A1 | 8/2017 | Kinder et al. |
| 2017/0243005 A1 | 8/2017 | Kinder et al. |
| 2017/0244734 A1 | 8/2017 | Kinder et al. |
| 2017/0244750 A1 | 8/2017 | Kinder et al. |
| 2017/0244754 A1 | 8/2017 | Kinder et al. |
| 2017/0244762 A1 | 8/2017 | Kinder et al. |
| 2017/0318034 A1 | 11/2017 | Holland |
| 2017/0359368 A1* | 12/2017 | Hodgman .......... H04L 63/1441 |
| 2018/0077189 A1 | 3/2018 | Doppke |
| 2018/0089574 A1 | 3/2018 | Goto |
| 2018/0091306 A1 | 3/2018 | Antonopoulos |
| 2018/0124073 A1 | 5/2018 | Scherman |
| 2018/0124085 A1 | 5/2018 | Frayman |
| 2018/0152480 A1 | 5/2018 | Kinder et al. |
| 2018/0181599 A1 | 6/2018 | Crabtree |
| 2018/0288198 A1* | 10/2018 | Pope ....................... H04L 41/16 |
| 2018/0367550 A1 | 12/2018 | Musuvathi |
| 2019/0014149 A1* | 1/2019 | Cleveland ............. H04L 67/104 |
| 2019/0037406 A1* | 1/2019 | Wash ..................... G06F 21/128 |
| 2019/0141491 A1 | 1/2019 | Cleveland et al. |
| 2019/0050554 A1 | 2/2019 | Fiske |
| 2019/0095801 A1 | 3/2019 | Saillet |
| 2019/0102646 A1* | 4/2019 | Redmon .............. G06K 9/4652 |
| 2019/0104154 A1* | 4/2019 | Kumar ................ H04L 63/1483 |
| 2019/0122258 A1* | 4/2019 | Bramberger ....... G06Q 30/0248 |
| 2019/0132344 A1 | 5/2019 | Lem et al. |
| 2019/0141079 A1 | 5/2019 | Vidas et al. |
| 2019/0149564 A1 | 5/2019 | McLean |
| 2019/0173919 A1* | 6/2019 | Irimie .................... G06N 3/082 |
| 2019/0297096 A1 | 9/2019 | Ahmed et al. |
| 2019/0342296 A1 | 11/2019 | Anandam |
| 2019/0377832 A1 | 12/2019 | McLean et al. |
| 2019/0379678 A1 | 12/2019 | McLean et al. |
| 2020/0036750 A1* | 1/2020 | Bahnsen ............. H04L 63/1416 |
| 2020/0036751 A1* | 1/2020 | Kohavi ............... H04L 63/1483 |
| 2020/0259791 A1* | 8/2020 | Mundilla Garcia ......................... H04L 63/0245 |
| 2020/0314122 A1* | 10/2020 | Jones .................. H04L 63/1441 |
| 2020/0351302 A1* | 11/2020 | Kyle ................... H04L 63/1425 |
| 2020/0351307 A1 | 11/2020 | Vidas et al. |
| 2020/0356665 A1 | 11/2020 | Denney et al. |
| 2020/0358795 A1 | 11/2020 | Urbanski et al. |
| 2020/0364338 A1 | 11/2020 | Ducau et al. |
| 2021/0067562 A1 | 3/2021 | Kinder et al. |
| 2021/0112087 A1 | 4/2021 | Tassoumt |
| 2021/0185057 A1 | 6/2021 | McLean |

FOREIGN PATENT DOCUMENTS

| | | |
|---|---|---|
| WO | WO2007002749 A2 | 1/2007 |
| WO | WO2007090605 A1 | 8/2007 |
| WO | WO2010059843 A2 | 5/2010 |
| WO | WO2021/067238 A1 | 4/2021 |

OTHER PUBLICATIONS

Alkhawlani, Mohammed, Mohammed Elmogy, and Hazem Elbakry. "Content-based image retrieval using local features descriptors and bag-of-visual words." International Journal of Advanced Computer Science and Applications 6.9 (2015): 212-219. (Year: 2015).*

E. Buber, Ö. Demir and O. K. Sahingoz, "Feature selections for the machine learning based detection of phishing websites," 2017 International Artificial Intelligence and Data Processing Symposium (IDAP), 2017, pp. 1-5, doi: 10.1109/IDAP.2017.8090317. (Year: 2017).*

Lin, Tsung-Yi, et al. "Microsoft coco: Common objects in context." European conference on computer vision. Springer, Cham, 2014. (Year: 2014).*

Y. Liu, Q. Wang, M. Zhuang and Y. Zhu, "Reengineering Legacy Systems with RESTful Web Service," 2008 32nd Annual IEEE International Computer Software and Applications Conference, 2008, pp. 785-790, doi: 10.1109/COMPSAC.2008.89. (Year: 2008).*

White, Joshua S., Jeanna N. Matthews, and John L. Stacy. "A method for the automated detection phishing websites through both site characteristics and image analysis." Cyber Sensing 2012. vol. 8408. International Society for Optics and Photonics, 2012. ( Year: 2012).*

URLVoid. URLVoid.com (retrieved from archive.org: https://web.archive.org/web/20180730215132/https://www.urlvoid.com/). Published Jul. 30, 2018. (Year: 2018).*

Buyukkayhan, Ahmet Sali; Oprea, Alina; Li, Zhou; and Robertson, William; "*Lens on the endpoint; Hunting for malicious software through endpoint data analysis*"; International Symposium on Research, in Attacks, Intrusions, and Defenses; RAID 2017: Research in Attacks, Intrusions, and Defenses Proceedings; pp. 73-79; Sep. 18-20, 2017; Atlanta, GA, USA.

*Secureworks—Log Management—Protect your infrastructure from known and emerging threats*; www.secureworks.com/resources/ds-log-management; 2015 (available).

Sofya Raskhodnikova & Adam Smith; CSE 598A. Algorithmic Challenges in Data Privacy; Lecture 2; Jan. 19, 2010.

* cited by examiner

SYSTEMS AND METHODS USING COMPUTER VISION AND MACHINE LEARNING FOR DETECTION OF MALICIOUS ACTIONS

TECHNICAL FIELD

The present disclosure generally is directed to systems and methods for detection of security threats and/or malicious actions by threat actors, and more specifically, systems and methods for detection or classification of phishing attacks. Other aspects also are described.

BACKGROUND

Malicious actors may use various tactics, such as phishing, to attempt to steal login credentials from unsuspecting internet users. For example, threat actors may attempt to steal details of a target's bank account or other personal information, such as their email accounts, corporate account information, etc., that provide the threat actors access to a person's and/or a company's confidential information. Oftentimes, users can be tricked into supplying valid login credentials to a webpage that looks legitimate, but is actually controlled by a threat actor. Then, the threat actor can use the stolen credentials to access the user's account, e.g., to steal money, or information thought to be safely protected by access controls. Popular countermeasures used to counteract phishing attacks include educating users to recognize signs/indicators of attacks, developing blacklists including webpages reported by users to be phishing sites, etc. According to some estimates, however, there still are millions of new phishing webpages registered each month, with phishing attacks being responsible for a majority of cybersecurity events. Thus, despite the existing protection solutions and/or countermeasures, threat actors still perceive phishing as the most successful means for compromising internet users, businesses, etc.

Recently, there have been some attempts to try to automate phishing detection, for example, through the use of social graphs, within a corporate network, to try to build a network of correspondence between users in order to identity abnormal connections to external sites. Such systems however often lead to the generation of false positives on new connections, and/or ignore or miss an initial connection from a company's network to a phishing site. Similarly, other systems have attempted to implement a deep belief network trained on labelled ISP data flow, but such an approach requires large amounts of labelled phishing raw logs with a model that needs to be continuously retrained as the landscape changes.

Accordingly, the present disclosure provides systems and methods that use computer vision and machine learning for phishing detection to address the foregoing and other related, and unrelated, issues/problems in the art.

SUMMARY

Briefly described, the present disclosure is directed to systems and methods utilizing computer vision and machine learning components and processes for enhanced detection of malicious behavior, such as potential phishing attacks. For example, the systems/methods of the present disclosure can implement a plurality of processes/components to initially detect when a user has been directed to or is navigating a webpage with interface elements, indicating that the site is impersonating a reputable site, and is being asked to provide login credentials; whereupon the user can be warned/alerted that the webpage is not a legitimate login page and/or can be stopped/prevented from providing login credentials through the site.

For example, the systems/methods can identify that the webpage that the user is navigating to is a login screen but is not in a Whitelist of recognized login pages, and further can utilize computer vision and machine learning components and processes to detect user interface elements, such as company logos, trademarks, etc. in order to identify webpages that are impersonating reputable companies. Furthermore, the systems/methods can provide alerts to the user (e.g., via popups, alarms, notifications, etc.), and the domain of the webpage can be labelled and stored in a database (e.g., in a Blacklist) for future use.

In one embodiment, the system for detection or classification of security threats and/or malicious actions, such as a user being directed to or accessing a phishing site or a phishing email, can include one or more processors and at least one memory having stored therein a plurality of instructions that, when executed by the one or more processors, implement one or more components that facilitate detection or classification of security threats/malicious actions, such as phishing attacks.

The one or more components can be configured to receive information or data related to a request for a user's information. Example requests can include an email or a webpage requesting a user's information/credentials, a webpage with a login for entry of a users personal credentials/login information, or other similar webpages or requests for credentialing information. The information or data related to the request can include iterate URLs, POST requests, email data in a data center, emails forwarded by user, webpages with a login form, etc. or combinations thereof.

The one or more components of the system can include an detection and extraction processor that is configured to make an initial determination as to whether the request is known to be malicious or known to be safe, e.g., identify if the website is on Whitelist or Blacklist, and if the request is not a known malicious or a known safe request website, submit the collected information to one or more components of the system including a classification engine.

In some variations, the initial detection and extraction processor can, for example, as part of an initial review/determination step, compare the information or data sought by the website request information or data in a blacklist and/or a whitelist to determine whether the request matches or is indicative of a known malicious or known safe request/site. Furthermore, the initial detection and extraction processor can compute or extract one or more features from the information related to the website request, including domain reputation, IP analysis, keywords in an email, or combinations thereof, to determine whether the request/site is a known safe or known malicious request.

The classification engine can include a computer vision model and a machine learning model. The computer vision model is configured to obtain at least one screenshot related to the request, and provide the screenshot and/or additional information or data related to the request to the machine learning model. The machine learning model can identify or extract screenshot information and generate or determine a probability or confidence level that the request is malicious or non-malicious based on the screenshot information. Such extracted and/or identified screenshot information can include user interface elements, logos, slogans, trademarks, phrases, keywords, images, indicia, or combinations thereof.

If the probability or confidence level developed by the machine learning model indicates that the request is malicious, e.g., the determined probability or confidence level exceeds a prescribed threshold, one or more components of the system, such as a logic/action processor, can be configured to classify the request as a malicious and/or generate and provide an alarm, alert, or notification to the user. The logic/action processor further can be configured to generate and/or update a Blacklist of known malicious requests based on output/classifications of the machine learning model.

In one embodiment, the present disclosure includes a method or process for detecting or classifying malicious activities or actions by threat actors, such as phishing attacks. The method can include receiving request information related to a website or similar request for a user's information, such as the user accessing a website or receiving an email, and can obtain one or more screenshots associated with the request/website, e.g., using a computer vision model. The method further can include providing the screenshots to a classifier including a machine learning model; with the machine learning model identifying or extracting screenshot information from submitted screenshots and analyzing the screenshot information and/or additional information to generate a probability or confidence level that the request/website is malicious. If the probability or confidence level that the website/request is malicious exceeds a prescribed threshold, the method can include taking further actions such as classifying the website, a domain, and/or an actor or actors associated therewith as malicious and generating an alert, notification or alarm for notifying the user.

Various objects, features and advantages of the present disclosure will become apparent to those skilled in the art upon a review of the following detail description, when taken in conjunction with the accompanying drawings.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

The following description, in combination with the Figures is provided to assist in understanding the teachings disclosed herein. The description is focused on implementations and embodiments of the teachings, and is provided to assist in describing the teachings. This focus should not be interpreted as a limitation on the scope or applicability of the teachings.

As shown in FIGS. 1-5B, the present disclosure provides systems and methods for detection and/or action of security threats and actions by threat actors, such as requests seeking user information, credentials, etc. as part of phishing attacks. For example, the systems and methods can utilize computer vision and machine learning components and processes to determine if a request or requests (such as a webpage requesting information being accessed by user, a webpage with a login form for entry of a user's login credentials/information, a link in an email or other action directing a user to webpage, etc. or other suitable requests) is a malicious attempt to hold itself out as legitimate request, while trying to obtain/steal the user's credentials and/or information; and if so, the systems and methods can direct or initiate one or more protective actions, such as generating an alert, alarm, etc. to the user, the user's employer, and/or to another suitable entity, such as a Managed Security Service Provider ("MSSP"), security researcher, etc., that the request is malicious, and/or can block or prevent further interaction with the requestor/threat actor, e.g., a webpage, domain, server, etc.

Figure 1:
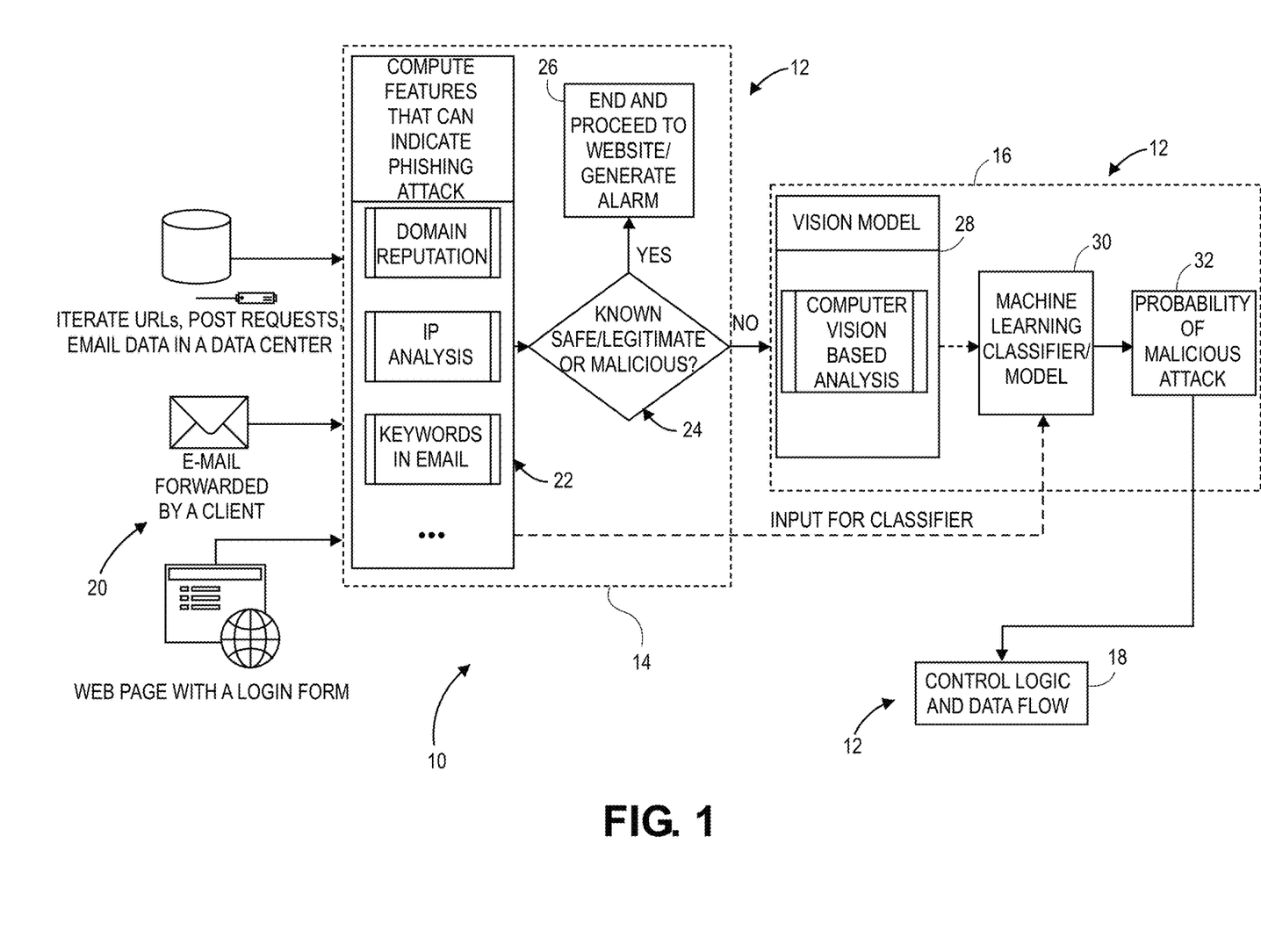
FIG. 1 shows a block diagram of a system for detection of security threats and/or malicious actions according to principles of the present disclosure.

In some embodiments, as indicated in FIG. 1, the system 10 for detection of malicious actions can comprise a plurality of components, modules, etc. 12, including a detection and extraction processor 14 configured to perform an initial analysis/search to determine whether or not such requests match a known threat or a known legitimate action. The plurality of components 12 further generally can include a classifier or classification engine 16 that is configured to collect and analyze webpage or email information from the request and generate a probability or likelihood, e.g., using machine learning analysis of screenshots or images and/or other information, that the request is a malicious action, such as a phishing attack. The plurality of components 12 also can include a logic/action processor 18 configured to control logic and dataflow and store the results of the machine teaming analysis for future determinations and take one or more protective actions to warn/alert the users of malicious activities or a probability or likelihood thereof.

FIG. 1 shows the detection and extraction processor 14, which will be configured to receive and analyze information/data 20 related to one or more requests for user information, such as an email requesting user credentials or personal information, a webpage prompting requiring entry of a user's login credentials, a link to a webpage or email, etc. The information/data 20 related to the request(s) can include, but is not limited to, Iterate URLs. POST requests, email data in a data center, emails forwarded by clients or data or information related thereto, webpages with a login form or data or information related thereto, etc., as generally shown in FIG. 1.

In one embodiment, the detection and extraction processor 14 can include one or more feature extractors, elements, etc. 22 configured to extract a domain or URL associated with the request, keywords in an email accompanying the request, an 1P analysis, or other features indicative of a phishing attack or other malicious actions, such as a domain registration age, a domain registrar, and a domain's SSL certificate details (e.g., if an SSL certificate is present), etc., based on/from the received request information. Thereafter, the detection and extraction processor 14 can analyze and compare the extracted, identified, or computed features of the request/webpage to known features and/or other information, such as in a Whitelist, Blacklist, and/or other repository of malicious and/or known legitimate/safe requestors (e.g., URLs, domains, etc.) to initially determine if the request is a known malicious or known safe/trusted action, or if further analysis is required.

As shown in FIG. 1, if the request is found to be a site or action known to be malicious or known to be safe (as determined at 24), the system 10 can make an initial determination to block or allow the requested access, to save or minimize use of computing resources. For example, as indicated at 26, if the request is known to be safe or legitimate, the system's process may end and communication with the requesting entity (e.g., email, email server, webpage, domain, etc.) may be allowed, but if the request is known to be malicious or attributable to a known threat actor, further communications therewith may be prevented or blocked and the user, the user's employer, or security provider can be notified and/or an alarm or further security protocol or activities initiated.

In one embodiment, the detection and extraction processor 14 can examine or analyze URLs related to the request to determine if the URLs are on a known bad list, such as a list of known phishing sites or domains also referred to as a Blacklist, or known good list of domains, such as a list of known legitimate or safe login pages or other webpages also referred to as a Whitelist, and therefore a full analysis is not required. The extraction processor 14 further can evaluate the URL's HTML DOM to determine if it includes a login page, and if the login page is determined to be an unknown logon page (e.g., a login page that is not on a Whitelist or a Blacklist), the extraction processor 14 can send the URL or information related to the request to the classifier 16 for a full analysis.

As FIG. 1 indicates, the classifier 16 can include a computer vision model 28 that is engaged to review the webpage/login site from the extraction processor 14 and facilitate extraction or obtaining of one or more screenshots or images, e.g., screenshots or images of an email, webpage, login page, etc. In some variations, the computer vision model 28 can include or employ a web automation framework configured to isolate and retrieve/obtain screenshots or images related to the request. e.g., screenshots of an email sent to the user or a URL's webpage. The web automation framework can include a tool used in front-end testing of webpages that facilitates the obtaining screenshots or images of URLs or emails in a secured manner, e.g., the automation framework can be configured for opening or execution and "detonation" of URLs, webpage links in emails, etc., in isolation, without opening such links, pages, etc., . . . through the user's system or network to minimize or substantially avoid infecting or otherwise adversely affecting the user's information handling system/device.

The classifier 16 further can include a machine learning model or classifier 30, and upon obtaining the screenshot(s) or image(s), the computer vision model 28 can provide the retrieved screenshot(s)/image(s) as one or more inputs to the machine learning model 30 for evaluation, analysis, or classification thereof. The machine learning model 30 can identify or extract screenshot or image information, including but not limited to, logos, trademarks, slogans, keywords, phrases, images and/or or other indicia, etc. And, based at least in part on this extracted screenshot or image information, the machine learning model 30 determines a probability or likelihood or confidence level 32 that the screenshot(s) or image(s) are indicative malicious activities, such as a threat actor's phishing attempt to pose as a reputable company.

In one variation, the machine learning model 30 can be trained such that given an RGB image of a webpage or email, it will output a location, class, and probability or confidence level that trademarks, logos, slogans, etc. and/or other screenshot-image information are indicative of a malicious attack, such as a phishing attack and/or other malicious actions. For example, Google® is one of the marks/sites often used for phishing attacks, and thus a link to this or other sites often spoofed or used for phishing attacks can be a factor given more or additional weight in determining the probability of a malicious request.

Additionally, or in alternative variations, further selected information related to the request can be provided as one or more inputs for the machine learning model/classifier 30. For example, as indicated in FIG. 1, one or more of the features (e.g., domain reputation, IP analysis, keywords in an email, a domain registration age, a domain registrar, and a domain's SSL certificate details, etc.) extracted or computed by the extractors 22 of the detection and extraction processor 14 can be provided as inputs for the machine learning model 30. Using these features, as well as the screenshot or image information, the machine learning model 30 can determine or generate a probability or confidence level that the request (e.g., the webpage or email requesting a user's information) is malicious, such as is being uses as part of a phishing attack.

After each iteration of the machine learning model 30, labeled data or information, such as information or data including a probability or likelihood or confidence level 32 that certain screenshots or images, extracted screenshot/image information, one or more features of the request information, or combinations thereof, relate to malicious actions, can be provided to a database or other repository for updating of and/or future iterations of the machine learning model 30, e.g., to improve the accuracy or efficacy of the machine learning model 30 with each iteration. Accordingly, over time, the system 10 can generate and update/populate one or more Blacklists including entities, such as URLs, domains, email servers, etc., that have been identified by the system 10 as malicious, rather than manually reported, to help increase early detection times of phishing attempts or other malicious actions/requests.

In one embodiment, the machine learning model 30 includes neural network, such as a convolutional neural network with a region proposal algorithm (e.g., Faster R-CNN) or other suitable neural network. In some variations, the algorithm of the machine learning model 30 further can limit object detection to selected or identified areas of interest in the obtained images/screenshots in order to help to reduce latency. Other site features, or identified information can be used as part of the machine learning model, however, without departing from the scope of the present disclosure, such as other suitable/reliable neural networks, support vector machines, anomaly detection algorithms, or other supervised or unsupervised learning models or statistical models and algorithms.

For training of the machine learning model 30, a labeled data set including a variety of labeled screenshot or image information or data set(s) can be collected/obtained (e.g., such as a screenshots, images, etc. corresponding to known reputable/trusted domains, as well as screenshots, images, etc. from previously known malicious domains or threat actors) and further can be generated and processed by the machine learning model 30. The labeled screenshot information or data set can be partitioned or otherwise separated into one or more training sets and a testing or validation sets. The machine learning classifier/model 30 can be applied to the training sets to calibrate or otherwise train the machine learning classifier 30 to learn and develop an ability to generate a probability or confidence level that the data of the training set is malicious, e.g., is a phishing attempt. Thereafter, the accuracy of the machine learning model's performance can be determined, e.g., it is determined whether the machine learning model 30 correctly quantifies the labeled data of the testing set at a threshold rate of accuracy, if the model's performance does not meet the threshold level of accuracy when compared to this testing or validation data, the classifier/model 30 can be further trained or calibrated using the training/validation data (or other additional training/validation data).

Figure 2:
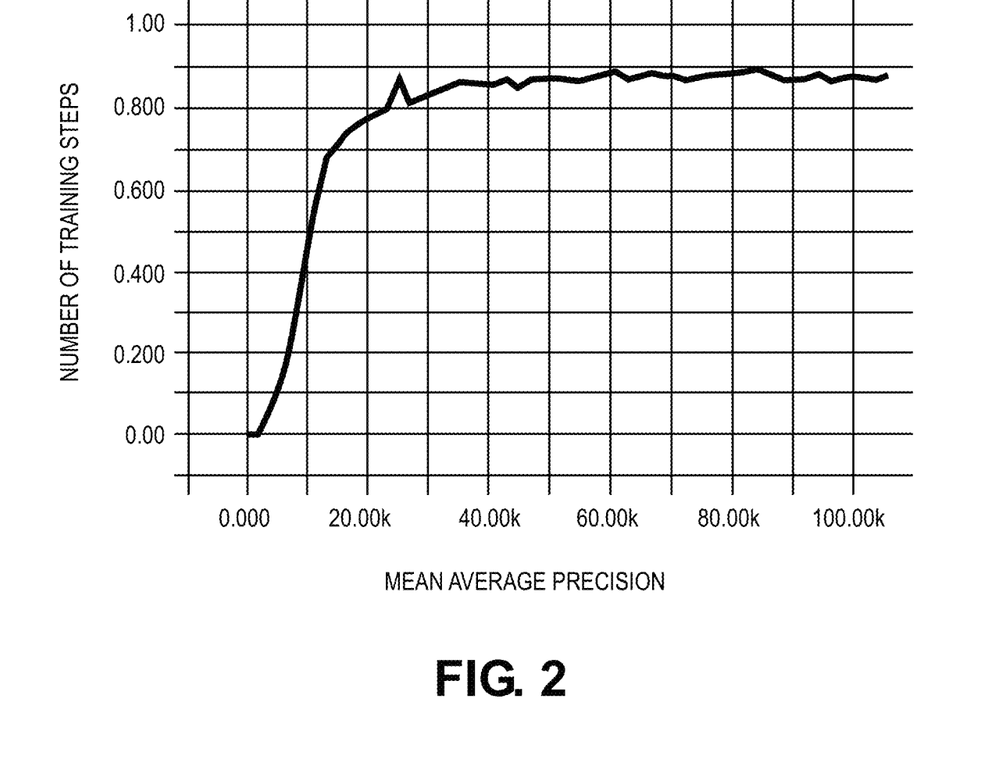
FIG. 2 is a graph depicting an accuracy of the machine learning classifier/model according to one aspect of the present disclosure.

In some variations, transfer learning can be practiced on the machine learning classifier/model 30 to attempt to reduce the amount of training data required for the model to converge to a high accuracy. In one example, the machine learning model was trained on an approximately 330,000 image COCO dataset, and then trained on a smaller set of 2000 images containing a varying number of trademarks for select companies. These select companies included companies that have been the target or subject of a large majority of phishing attacks. FIG. 2 provides a graph illustrating a mean average precision for the model as a function of the number of training steps.

FIG. 1 additionally shows that the classifier 16 can submit information or data related to the probability or confidence level of a malicious attack to a logic/action processor 18 configured to control logic and data flow to take one or more protective actions based on the generated probability/confidence from the machine learning model 30. For example, the logic/action processor 18 can receive information related to the classification or the probability or confidence level of a phishing attack or other malicious action, and if the probability or confidence level equals or exceeds a certain/prescribed threshold or is within a specific standard of deviation of the prescribed threshold, to indicate a phishing attempt or other malicious action, the logic/action processor 18 can generate one or more alerts, alarms, notifications, etc. (such as a popup window 44 shown in FIG. 3) to notify users (or security service providers) of the probability or likelihood of a phishing attack or other malicious action. In some variations, however, the logic/action processor 18 can provide an alert, alarm, or other notification including the probability or confidence level of a phishing attack or other malicious action even if the probability or confidence level does not exceed a prescribed threshold to allow users and/or internal network security or other security service provider to make a determination as to whether to proceed to a webpage and/or provide their credentials/information based on the generated probability/confidence level.

The logic/action processor 18 also can be configured to take one or more actions to inhibit, prevent, or block communications with the webpage, URL domain, email server, etc. For example, logic/action processor 18 can prevent a webpage from generating/creating additional dialogues. The logic/action processor 18 also can be configured to automatically label and store results to a central repository of known safe and known bad domains (e.g., Whitelists and Blacklists) for use by the initial detection and extraction component 14 in initial reviews and detections of incoming requests. The classifications/probability information further can be used for further training of the machine learning model 30. In some variations, logic/action processor 18 will take one or more actions if a probability or confidence level above a threshold was outputted by component 16, and then the user can be notified of a phishing attack before the user has entered their credentials and/or before the phishing site has been manually reported by other existing services.

Figure 3:
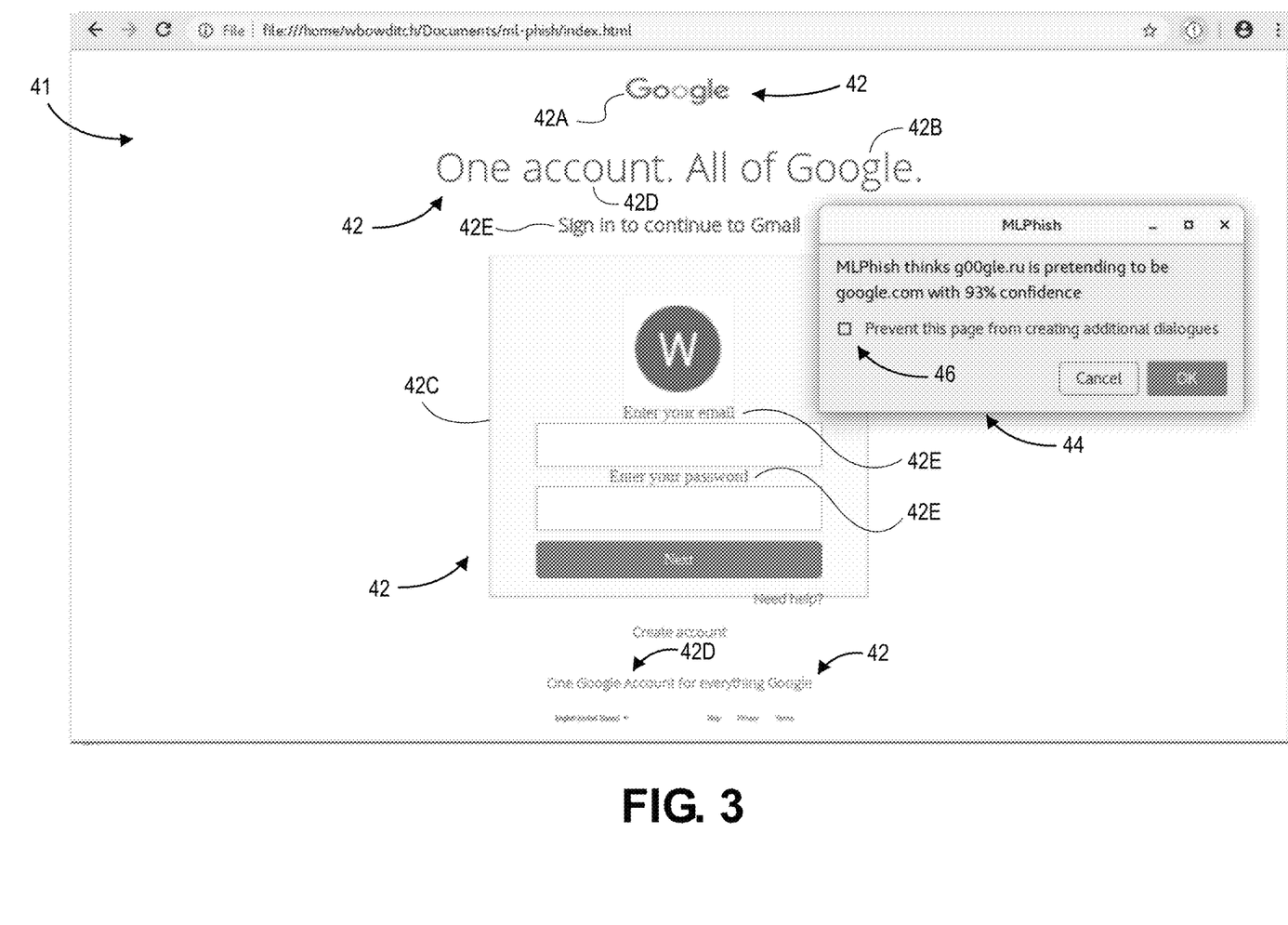
FIG. 3 shows an exemplary screen provided by the system according to one aspect of the present disclosure.

FIG. 3 shows an example screen 40 provided by the system 10 according to embodiments of the present disclosure. As shown in FIG. 3, the screen 40 can include/provide a webpage login screen 41 for a webpage-domain holding itself out to be legitimate login webpage for a known reputable domain/company (e.g., www.google.com as provided by Google®) as part of a phishing attack. The webpage screen 41 shown includes information/data 42, such as logos 42A, trademarks 42B, images 42C, slogans 42D, phrases/character strings 42E, selectable elements 42F, etc., that can be extracted and analyzed by the system 10 (e.g., using the machine learning classifier/model 30) as described above to generate a probability/likelihood or confidence level that the webpage is being used as part of a phishing attack. For example, based on the information/data 42 provided on the screen 40, it was determined with about 93% confidence that the webpage is pretending to be a known legitimate webpage (e.g., www.google.com). FIG. 3 further shows that the system 10 can generate/provide an alert/notification, such as pop-up window 44 superposed on the screen 40, providing/showing the confidence level that the webpage is a phishing attack. The pop-up window 44 can include one or more selectable elements 46, areas, icons, etc. may allow a user to prevent further communications with the webpage/domain, such as to prevent the webpage from creating additional dialogues.

Figure 4:
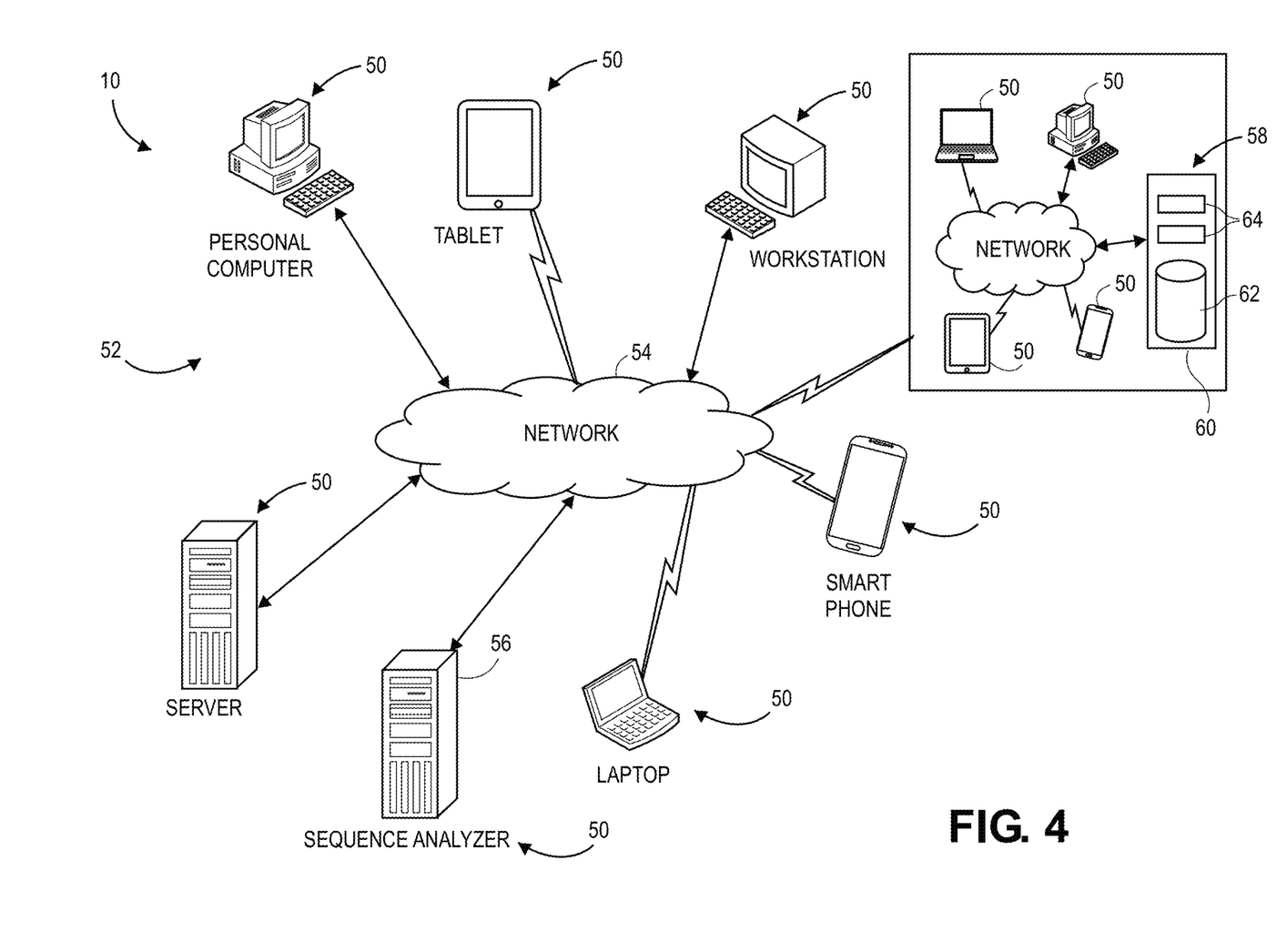
FIG. 4 shows an example of a networked information handling systems for the system according to principles of the present disclosure.

According to embodiments of the present disclosure, the various components or modules 12 (e.g., the detection and extraction processor 14, the classification engine 16, and the logic/action processor 18) shown in FIG. 1 of the system 10 can include computer programmable instructions, workflows, etc. that can be stored in memory and executed or accessed by one or more processors (generally referred to as "a processor") of one or more information handling systems 50, e.g., as generally shown in FIG. 4. It also will be understood that in some instances all of the components 12 shown in FIG. 1 can be implemented as a part of one information handling system, e.g., when there are sufficient processor and memory computing resources therein. In other instances, a form of distributed computing may be adopted where some of the components may be implemented as software that is stored remotely or in a different device and that is also executed remotely by or one or more remote processors, e.g., in a server, that is in communication with the information handling system over a network. Furthermore, although FIG. 1 shows just three components, e.g., 14, 16, and 18, for executing its various processes, the system 10 can include any suitable number of components, models, processors, engines, etc., such as a single component or four or more components, without departing from the scope of the present disclosure.

For purposes of this disclosure, the system 10 can be part of and/or operate on an information handling system 50 (FIG. 4) that may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, a touchscreen and/or a video display. The information handling system also may include one or more buses operable to transmit communications between the various hardware components.

As shown in FIG. 4, in some embodiments, the system 10 can include a networked system 52 of information handling systems/devices 50 or other communicable systems/devices. A network 54 may provide data communications among the information handling systems/devices 50, which can include workstations, personal computers, smart cellular telephones, a personal digital assistants, laptop computers, servers, and other suitable devices. The network 54 can include a private or public network, such as a local area network, or other suitable network(s), such as the Internet or another wide area network, virtual personal network, peer to peer filing sharing system, and/or other suitable communication lines, or combinations thereof. FIG. 4 also indicates that the linked or networked information handling systems 50 may include one or more monitoring devices 56 communicatively coupled to the network 54. The monitoring device(s) 56 can be managed by a Managed Security Service Provided ("MSSP").

In one embodiment, the monitoring device(s) 54 may include a server or sequence analyzer or other client suitable computing device that has a processor and a memory or other suitable storage. The memory can include a random access memory (RAM), read only memory (ROM), and/or other non-transitory computer readable medium. The monitoring device(s) 56 further typically will be operable to store and execute computer readable instructions to continuously monitor, in real-time, activity at each networked system, for example, activity of the information handling systems 50 connected to network 54. The monitoring device(s) 56 can ingest/aggregate information or data logs related to activities of the information handling systems 50 and can provide these ingested/aggregate data logs or information or data related thereto to the initial detection component 14 for analysis by the system 10 for detection of malicious actions, phishing attacks, etc. In addition, or in the alternative, the system 10 can include a data center 58, such as a data center 58 management by an MSSP, with a plurality of networked information handling systems 50. e.g., including one or more servers 60 with at least one memory 62 and one or more processors 64 for receiving information or data logs related to activities of the information handling systems 50 of system 52. These information/data logs can include raw or normalized information or data, such as raw or normalized POST requests. URLs, etc. from emails and webpages accessed by the information handling systems 50.

In additional or alternative embodiments, the system 10 can include a distributed application, such as an Apache Spark application, that consumes raw logs from clients and injects security events for review by an MSSP. In these embodiments, the MSSP can consume proxy POST request logs from client managed information handling systems/device, which can contain the client's host, the POST request, and the URL of webservers. For example, POST requests are generally sent to web servers when submitting information such as login credentials. The system 10 thus can analyze these filtered URLs and notify clients of phishing attacks and/or other malicious actions attempted against their employees.

In further embodiments, the system 10 can be a part of a larger security service system managed by an MSSP, security researchers, or other suitable entities for complying/building a phishing orchestration playbook. For example, clients can submit emails or URLs that the client believes are suspicious to the MSSP, who then provide the information/data to the system 10 for analysis. Depending on the results of the model (e.g., probability or confidence level of a phishing attack), the MSSP could escalate response tickets, alerts, alarms, etc. to the client(s), such as if a probability or likelihood of a phishing attack reaches a prescribed level of confidence.

In even further embodiments, the system 10 can include a browser extension, such as Google Chrome® or Microsoft Internet Explorer® Extension. For example, the detection and extraction processor 14 can be in communication with an API of the selected web browser, such as Chrome Extension API, while parts of the classification engine 16, such as the trained classifier/model 30, can be hosted on RESTful service (e.g., implemented with a Python REST library Flask). Accordingly, the initial detection and extraction processor 14 can receive request information/data, such as POST requests, URLs of webservers, etc., as a user browses or otherwise interacts with one or more webpages, and the system 10 can analyze the webpages, in real-time, to provide user with alerts, alarm, etc. (such as shown in FIG. 3) to notify users of probability, likelihood, confidence interval, etc. that certain websites are being used as part of phishing attacks.

In other embodiments, the system 10 also can include a RESTful service that provides/hosts a webpage that can be accessed by users, security researchers, etc. can store, check or review URLs, emails, etc. against the classifier 16. For example, the webpage allows the users to "detonate" domains, suspicious webpages, etc. without opening the suspect webpage itself via the user's network/system, and can help to develop Whitelists/Blacklists as a useful public resource for MSSPs, security researchers, etc. Furthermore, the increased use of the service would more rapidly generate larger, more comprehensive Blacklists and Whitelists for use by an MSSP, security researchers, etc., as well as larger training data sets for training, rebuilding, or improving the accuracy of the trained model 30. In addition, or alternatively, suspicious requests, including webpages, workflows, etc., . . . can be processed using automated analytics or a playbook, such as at an MSSP, to help further identify and quarantine potential threats.

Figure 5A:
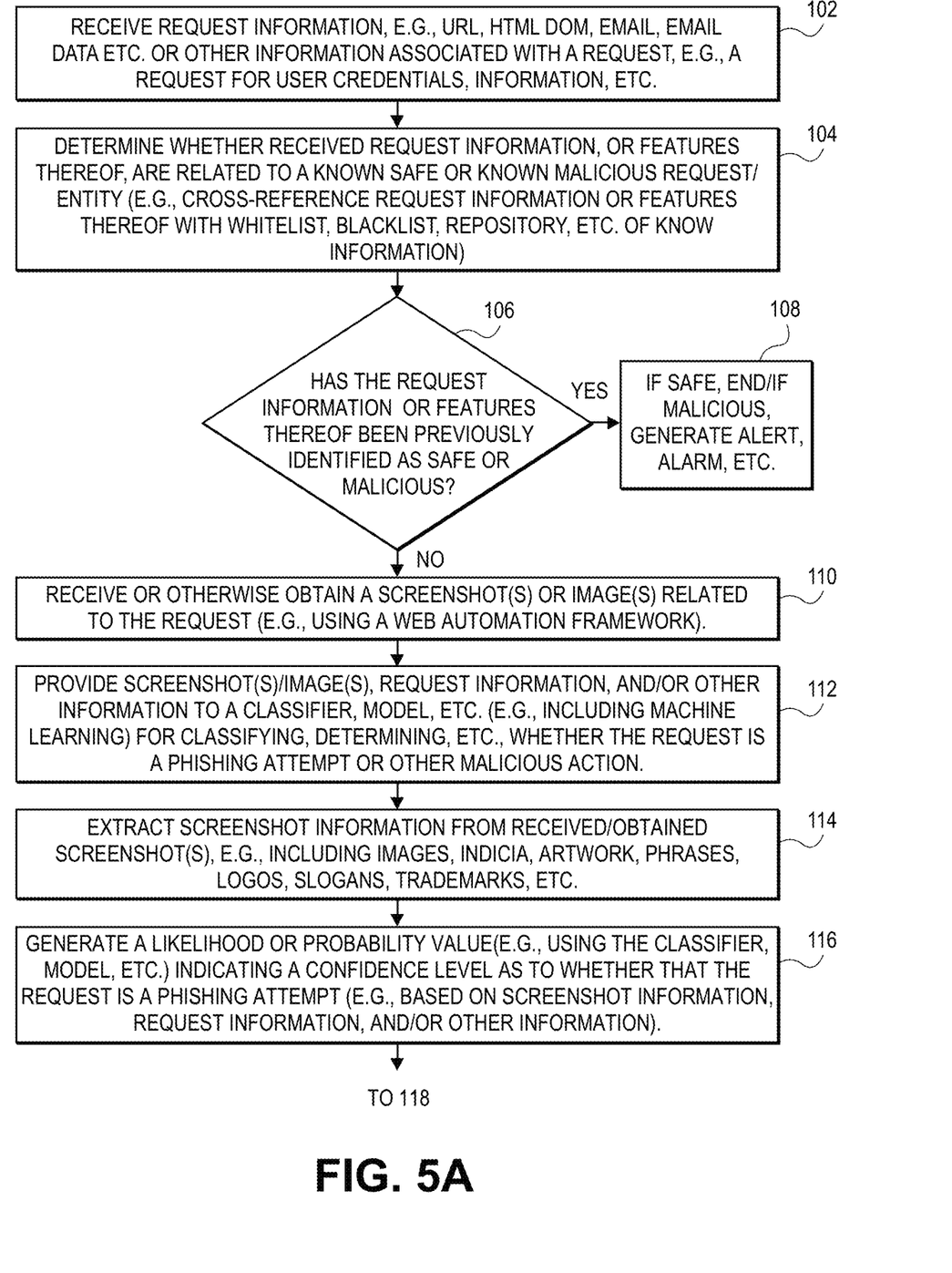
FIGS. 5A and 5B show a process flow diagram for a method or process for phishing detection/classification according to principles of the present disclosures.
Figure 5B:
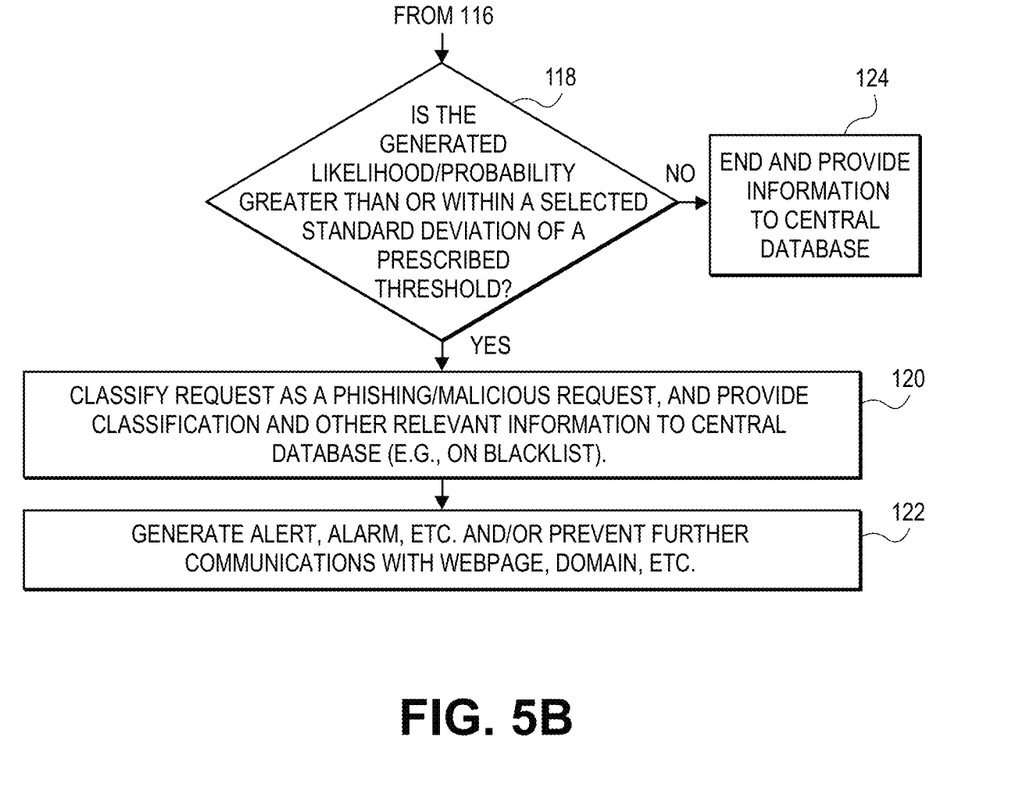

FIGS. 5A-B show a flow diagram for a method or process for determining/detecting malicious actions, such as a phishing attack in which a webpage or email is attempting to pose as a legitimate webpage/actor to obtain/steal the user's credentials. The method or process can be a computer/software implemented process that is executed by one or more processors of an information handling system and/or components of one or more information handling systems, such as an information handling systems and devices 50 similar to those shown in FIG. 4, based on instructions stored in one or more memories in communication therewith.

As shown in FIG. 5A, at 102, a request for information or data, such as an email or webpage requesting a user's information, a website login page, etc., is received from internal or external data producers, e.g., an email with a link is received or a user accesses a website seeking credentialing information, etc. The request can include a URL, HTML, DOM, POST requests, emails or data/information related thereto, etc., or other suitable information/data.

Thereafter, at 104, it is determined whether the received request for information/data is related to a safe/legitimate or known malicious request (e.g., using the detection and extraction processor 14). In one embodiment, the request for information/data can be cross-referenced with information on a Whitelist, Blacklist, or other repository or database, etc. of known data/information identifying safe or malicious requestor, e.g., domains, email servers, etc.

If the request (including features thereof) is associated with or identified as safe or malicious, at 106, the process proceeds to step 108 at which specific actions can be taken for known safe/legitimate or known malicious requests. If the request is identified as safe, the process/method can end and further communication with the requestor may be permitted (e.g., the user may be allowed to proceed to and/or access a webpage). Alternatively, if the request information is identified as a known malicious site or associated with a site on a Blacklist, an alert, alarm, or other notification, etc. can be generated and prompted to the user, such as shown in FIG. 3, and a log or report can be generated. In some variations, other actions can be taken such as further communications from the webpage or email provider being prohibited, e.g., users may be prevented from going to or accessing the webpage, responding to the email, the webpage may be prevented from generating additional dialogues, etc.

If the request information, or features thereof, has not been previously identified as either safe or malicious at 106, as shown in FIG. 5A, one or more screenshots or images associated with or related to the request for browser extension can be obtained at 110 (e.g., by the computer vision model 28 of the classifier 16). In one embodiment, a web automation framework can be used to safely receive or obtain webpage screenshots/images—e.g., the web automation framework can be used for obtaining screenshots from a webpage in an isolated manner without compromising the user's information handling system, device, etc.

At 112, the screenshots and/or other information can be provided/submitted to the machine learning model 30 to classify, determine, etc. whether the request is a phishing attempt or other malicious action (FIG. 5A). Screenshot or image information from the received or otherwise obtained screenshots or images, such as including images, indicia, phrases, logos, slogans, trademarks, keywords, etc., then can be identified, extracted or otherwise obtained at 114 (FIG. 5A).

At 116, the machine learning model 30 can generate a likelihood/probability indicating a confidence level or confidence interval as to whether the request relates to malicious actions, such as a phishing or other actions by thereat actors, based on the screenshot information or other suitable information (FIG. 5A).

FIG. 5B shows that if the general likelihood/probability or confidence interval is greater than or within a selected standard deviation of a prescribed threshold (e.g., about 90%, about 92%, about 93%, 94%, 95%, etc.), as determined at 118, then the request can be classified as a phishing or malicious attempt and the classification and other relevant information can be provided to a central database, repository, etc., e.g., can be added to a Blacklist for identified malicious actions, threat actors, etc. at 120. Furthermore, at 122, a log and an alert, alarm, other notification, etc. can be generated to notify the user of the likelihood or confidence interval that the request is malicious (e.g., as shown in FIG. 3) and/or further communications with the webpage, domain, URL, etc. can be prevented or prohibited (e.g., using the logic/action processor 18).

As indicated in FIG. 5B, if the general likelihood is not greater than or within a selected or standard deviation of a prescribed threshold as determined at 118, the process can end and the user may be allowed to proceed with communications with the requester, e.g., open or proceed to the webpage, at 124. In additional or alternative variations, even if the probability/likelihood is not greater than or within a selected standard deviation of the prescribed thresholds, the user and/or a security service for the network or information handling system may be notified that there is a substantial probability or confidence level that the request likely is malicious, e.g., represents a phishing attempt with the user prompted to confirm the site is safe, contact security, or take other actions. As a further, additional or alternative operation, a suspicious request and related URL, emails, etc. can be processed using a series of automated analytics, such as a playbook, by an MSSP or other security for the information handling system. Depending on the results of the playbook, the generated probability of a threat can be adjusted and/or a further response calculated where a threat is believed to be present. This information further can be provided to the central database for use in further determinations/classifications (e.g., known safe requests can be provided to a Whitelist of safe requests/actors).

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

What is claimed is:

1. A system for detection of security threats and/or malicious actions, comprising:
one or more processors and at least one memory having a plurality of instructions that when executed by the one or more processors implement one or more components are configured to:
receive a request seeking information or data related to a user's credentialing or personal information, and determine whether the request is associated with a webpage or requestor that is known to be malicious or known to be safe;
if the request is not determined to be associated with a known malicious or known safe webpage or requestor, obtain a screenshot related to the request, wherein the screenshot comprises an image of a web page and wherein the one or more components comprises a web automation framework configured to, in isolation of a system or network of the user, securely navigate to the webpage and obtain the screenshot of the webpage;

submit the screenshot to a machine learning model, and generate a probability that the request is malicious or non-malicious based on screenshot information identified and extracted from the screenshot using the machine learning model; and if the probability that the request is malicious exceeds a prescribed threshold:

determine, based on the probability and on a series of automated analytics, an adjustment to the probability thereby defining an adjusted probability, and if the adjusted probability that the request is malicious exceeds the prescribed threshold, classify, in real-time, the request and/or webpage and/or requestor associated therewith as a malicious and/or generate and provide an alarm, alert, or notification.

2. The system of claim 1, wherein the request comprises at least one of a webpage or an email requesting the user's information or credentials.

3. The system of claim 1, wherein the information or data sought by the request for information includes Iterate URLs, POST requests, links to webpages, emails forwarded by user, webpages with a login form, or combinations thereof.

4. The system of claim 1, wherein the one or more components include a detection and extraction processor configured to compare the information or data sought by the request for information to information or data of a Blacklist and/or a Whitelist to determine whether the request for information is associated with a site or requestor that is known to be malicious or known to be safe.

5. The system of claim 4, wherein the detection and extraction processor is configured to compute or extract one or more features from the information or data sought by the request, including domain reputation, IP analysis, keywords in an email, a domain registration age, a domain registrar, a domain's SSL certificate details, or combinations thereof, to determine whether the request is a known safe or known malicious request.

6. The system of claim 1, wherein the screenshot information includes user interface elements, logos, slogans, trademarks, phrases, keywords, images, indicia, or combinations thereof.

7. The system of claim 1, wherein the machine learning model includes a machine learning algorithm including neutral network with a regional proposal algorithm.

8. The system of claim 1, wherein the one or more components are further configured to generate and/or update a Blacklist of known malicious requests based on output of the machine learning model.

9. The system of claim 1, wherein the request and the screenshot are received from a user's browser extension corresponding to the system.

10. The system of claim 1, wherein the machine learning model is trained with a first dataset including labeled images and with a second dataset including trademark images.

11. The system of claim 10, wherein the labeled images are included in a COCO dataset.

12. The system of claim 10, wherein the trademark images include an amount of images less than that of the labeled images and selected from companies that are frequently targeted by phishing attacks.

13. The system of claim 1, wherein the alarm, alert, or notification includes a pop-up window, the pop-up window including the probability or confidence level that the request is malicious and a user selectable option to thereby allow a user to prevent the webpage from creating additional dialogues.

14. The system of claim 1, wherein the system includes a RESTful service that provides a webpage, the webpage accessible by the user and to enable the user to submit the request seeking information.

15. A method for detecting or classifying malicious activities, comprising:

receiving request information related to a request for a user's credentialing information;

obtaining one or more screenshots associated with the request;

providing the one or more screenshots and the request information to a classifier including a machine learning model;

using the machine learning model, computing or extracting one or more features from the request information, including domain reputation, IP analysis, keywords in an email, a domain registration age, a domain registrar, a domain's SSL certificate details, or combinations thereof;

generating with the machine learning model a probability or confidence level that the request is malicious based at least in part on identified screenshot information from the one or more screenshots and the one or more features extracted from the request information;

if the probability or confidence level that the request is malicious exceeds a prescribed threshold, determine, based on the probability and on a series of automated analytics, an adjustment to the probability thereby defining an adjusted probability; and if the adjusted probability that the request is malicious exceeds the prescribed threshold:

classifying the request and/or an actor associated with the request as malicious, generating an alert, notification, or alarm and/or blocking further communication with the request and/or the actor associated therewith, and generating or compiling a blacklist of known malicious requests based on output of the machine learning model.

16. The method of claim 15, wherein the request compromises a webpage or email requesting a user's login information or credentials.

17. The method of claim 16, wherein the information or data related to the request includes Iterate URLs, POST requests, email data in a data center, emails forwarded by user, webpages with a login form, or combinations thereof.

18. The method of claim 16, further comprising:

comparing the information or data related to the request information to information or data in a blacklist and/or a whitelist to determine whether the request is a known malicious or known safe request.

19. The method of claim 16, wherein the screenshot information includes user interface elements, logos, slogans, trademarks, phrases, keywords, images, indicia, or combinations thereof.

20. The method of claim 16, wherein the machine learning model includes a machine learning algorithm including neutral network with a regional proposal algorithm.

21. The method of claim 15, wherein blocking further communication with the request and/or the actor associated therewith includes preventing generation of additional dialogues from the request and/or actor.

22. A non-transitory computer-readable medium including instructions for detecting or classifying malicious activities, which instructions, when executed by one or more processors, cause the one or more processors to perform a method comprising:

receiving request information related to a request for a user's credentialing information;

comparing the request information to information or data in a blacklist and/or a whitelist to determine whether the request is a known malicious or known safe request;

if the request is not determined to be a known malicious or known safe request, obtaining one or more screenshots associated with the request, wherein the screenshot comprises an image of a web page obtained using a web automation framework configured to securely navigate to the webpage and obtain the screenshot of the webpage in isolation of a system or network of the user;

providing the one or more screenshots and the request information to a classifier including a machine learning model;

computing or extracting one or more features from the information related to the request, including domain reputation, IP analysis, keywords in an email, a domain registration age, a domain registrar, a domain's SSL certificate details, or combinations thereof, to determine whether the request is a known safe or known malicious request;

generating with the machine learning model a probability or confidence level that the request is malicious based at least in part on identified screenshot information from the one or more screenshots and the request information; and if the probability or confidence level that the request is malicious exceeds a prescribed threshold:

determine, based on the probability and on a series of automated analytics, an adjustment to the probability thereby defining an adjusted probability, if the adjusted probability that the request is malicious exceeds the prescribed threshold, classifying the request and/or an actor associated with the request as malicious, and generating an alert, notification, or alarm and/or blocking further communication with the request and/or the actor associated therewith.

* * * * *